United States Patent Office 3,007,914
Patented Nov. 7, 1961

3,007,914
MONOAZO DYESTUFFS
Gerhard Dittmar, Leverkusen, Rolf Pütter, Dusseldorf, and Walter Scholl, Koln-Mulheim, Germany, assignors to Farbenfabriken Bayer Aktiengesellschaft, Leverkusen, Germany, a corporation of Germany
No Drawing. Filed May 2, 1956, Ser. No. 582,083
Claims priority, application Germany June 15, 1955
7 Claims. (Cl. 260—146)

The present invention relates to monoazo dyestuffs, their metal complex compounds and to a process for their manufacture. More particularly it relates to monoazo dyestuffs corresponding to the following formula

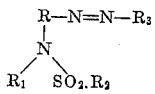

and the heavy metal complexes, preferably the chromium and cobalt complex compounds of said azo dyestuffs. In the above formula R means a radical of the benzene series, bearing in o-positions to the azo bridge a group capable of forming a metal complex, $R_1$ stands for an alkyl or hydroxy-alkyl radical, $R_2$ means alkyl, aralkyl or aryl and $R_3$ stands for a coupling component bearing in o-position to the azo bridge a group capable of forming a metal complex, the radicals R, $R_2$ and $R_3$ being free from sulfonic acid and non-complex forming carboxylic acid groups.

The monoazo dyestuffs can be obtained by coupling diazotized amino benzenes being free from sulfonic acid and non-complex forming carboxylic acid groups and having the formula

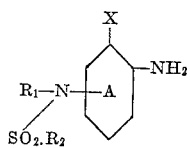

wherein X means a group capable of forming a metal complex, $R_1$ and $R_2$ have the same meaning as above and the benzene nucleus A may be further substituted by non-ionic radicals, with compounds which couple in o-position to a group capable of forming a metal complex and which are free from anionic solubilizing groups. The monoazo dyestuffs thus obtained are converted on the fibre, preferably, however, in substance into metal complexes, preferably into the chromium or cobalt complexes.

As the simplest amines which may be used in accordance with the invention there may be mentioned:

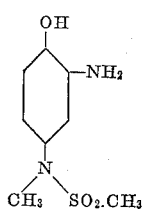

M.P. of the acetyl compound 210° C.

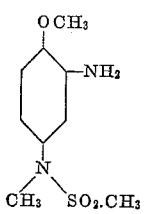

M.P. of the acetyl compound 151° C.

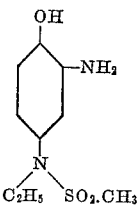

M.P. of the acetyl compound 186° C.

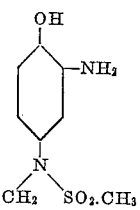

M.P. of the acetyl compound 190° C.

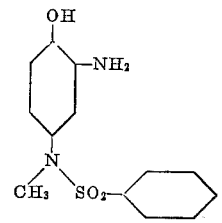

M.P. of the acetyl compound 203° C.

These and similar compounds may be obtained, for example, in the following manner:

3-nitro-4-chloraniline is reacted with a sulfonic acid chloride in pyridine, the alkali-soluble sulfonyl amino compound thus obtained is alkylated with dialkyl sulfates or alkyl halides, the chlorine is replaced by hydroxyl by heating in a soda alkaline medium, and the nitro group is finally reduced with iron; by reacting the acetylated amino compounds with dialkyl sulfate the corresponding o-alkyl ethers are obtained.

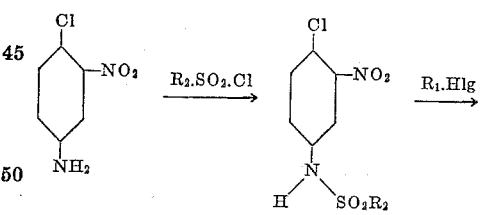

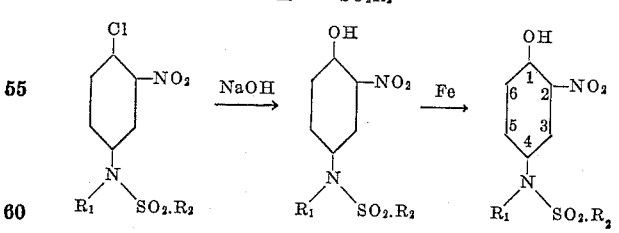

By the use of ortho-nitrochloranilines having the amino group in a different position, aminophenols may be obtained in a similar manner which contain the radical

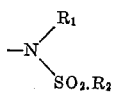

in a position other than the 4-position.
Due to the great number of sulfonic acid chlorides and alkylation agents very large variations are made possible so that by a suitable selection the dyeing properties of the dyestuffs obtainable from these amino phenols may be exactly adjusted for a definite purpose.

A very great variety of compounds may be employed as coupling component as long as they couple in the ortho-position to a group capable of forming a complex, and are free of ionic substituents such as sulfonic acid or carboxylic acid groups. Coupling components of this kind are, for example, acetic acid arylides, pyrazolones, hydroxy naphthalenes which couple in the ortho-position to the hydroxyl group, 1-acylamino-7-hydroxynaphthalenes, dihydroxyquinoline, dihydroxy-iso-quinoline, acylamino-phenols which couple in the ortho-position to the hydroxy group, 4-methyl-chinolones, 1,4-naphthhydroquinone-methylenesulfone ethers; hydroquinone-methylenesulfone ether (cf. German Patent 913,177 for the preparation of the two last components); aminobenzotriazoles.

The preparation of the metal complexes of the monoazo dyestuffs thus obtainable is carried out in accordance with known processes; on the fibre, for example, by the single bath chrome process or in substance. In the latter case the metallisation processes proceeding in an alkaline medium are preferably employed which according to experience lead to the so-called 2:1 complexes. Processes of this kind are employed for example in the preparation of the chromium complexes with ammonium salicylate-chromic complexes or with chromates in the presence of reducing carbohydrates (German patent specification 929,567), and in the preparation of cobalt complexes with salts of the bivalent cobalt or complexes of the trivalent cobalt.

The metal-free dyestuffs may also be used in known manner for the preparation of mixed complexes, that is of metal complexes in which the chromium or the cobalt atom respectively belong to two different monoazo dyestuffs. In this case both monoazo dyestuffs may belong to the group claimed or one of these dyestuffs to that group whilst the other belongs to a different group of metallizable monoazo dyestuffs. The mixed complexes are formed by the action of chromium or cobalt yielding agents on mixtures of two different monoazo dyestuffs. They are obtained in the pure state by first preparing the 1:1 complexes and by subsequently reacting these with a second molecule of a monoazo dyestuff having a different structure.

The dyestuffs are excellently suitable for dyeing and printing animal materials such as wool, silk, leather; wool-like synthetic fibres of polyamides or polyurethanes are also dyed. The monoazo dyestuffs metallised in substance have a good affinity from a neutral to weakly acetic acid bath. The colours thus obtained distinguish themselves by a brilliancy of the shade, by a good levelling capacity, and good to very good general fastness properties.

The following examples are given for the purpose of illustrating the invention.

*Example 1*

21.6 kilograms of 1-amino-2-hydroxy-5-(N-methyl-N-methylsulfonyl)-aminobenzene are suspended with 75 kilograms of ice and 25 litres of hydrochloric acid (d 1.20) and diazotized at 0° C. with the addition of a solution of 7.6 kilograms of sodium nitrile in 50 litres of water. The pale yellow solution of the diazo compound is stirred for 30 minutes whereupon the excess nitrous acid is destroyed by the addition of amidosulfonic acid. The diazo solution thus obtained is run with good stirring within 10 minutes into a solution of 23.6 kilograms of 1,4-naphthhydroquinone methylene sulfone ether in 60 litres of water, 11 litres of sodium hydroxide solution 40° Bé., and 20 litres of a 20 percent ammonia solution. After the solution of the diazo compound has been run in, a further 40 litres of a 20 percent ammonia solution and 20 litres of a sodium hydroxide solution 40° Bé. are slowly added to the coupling mixture which is kept at 0° C. during the coupling. The pH value of the reaction mixture is 13.5.

The coupling is completed after about 5 hours, and the precipitated dyestuff is filtered off by suction. It corresponds to the formula:

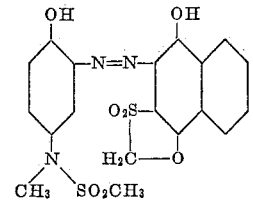

The dry dyestuff is a violet-blue powder, which dissolves in water with a violet coloration, in a 10 percent sodium hydroxide solution with a Bordeaux red coloration. The dyestuff dyes wool by the single bath chrome process in level fast clear blue shades.

*Example 2*

The dyestuff obtainable by the process of Example 1 is dissolved in 2,000 litres of water and 6 kilograms of sodium hydroxide at 90° C. A solution of 7.5 kilograms of potassium bichromate and 13.8 kilograms of glucose are added dropwise with stirring within 10 minutes. The reaction mixture is held for a further 10 minutes at 90–95° C., allowed to cool to 70° C. and the chromium complex is separated from the solution by the addition of 50 kilograms of rock salt, isolated and dried. The dyestuff-chromium complex obtained in this manner is a bluish black powder which dissolves in water with a blue coloration. Wool is dyed from a neutral bath in level clear blue shades of excellent fastness properties.

*Example 3*

The dyestuff obtainable by the process of Example 1 is dissolved in 2,500 litres of water and 4 kilograms of sodium hydroxide. A solution of 115 litres of a cobalt salt solution is run in at 90° C. with stirring, which is prepared as follows: 281 kilograms of crystalline cobalt sulfate are dissolved in 1,000 litres of water. This solution is rapidly poured into 500 litres of a 20 percent ammonia solution with vigorous stirring. A 30 percent hydrogen peroxide is subsequently added until a sample gives no further precipitate with a 10 percent sodium hydroxide solution. The dark brown solution is made up to 2,000 litres with water.

The formation of the dyestuff-cobalt complex is completed after a few minutes; 30 kilograms of rock salt are added to the dyestuff complex solution and the precipitated cobalt complex is isolated. The dry dyestuff is a bluish violet powder which dissolves in water with a bluish violet colour. Wool is dyed from a neutral to weakly acid bath in fast level violet shades.

If 1-amino-2-hydroxy-5-(N-ethyl-N-methyl-sulfonyl)-aminobenzene or 1-amino-2-hydroxy-5-(N-methyl-N-benzene-sulfonyl)-aminobenzene is used in Example 1 instead of 1-amino-2-hydroxy-5-(N-methyl-N-methyl-sulfonyl)-aminobenzene the chromium or cobalt complexes are obtained by the process of Example 2 or Example 3, which dye wool in similar shades but possess a better affinity for the fibre from a neutral bath.

The following table describes additional metal complexes of monoazo dyestuffs which are obtained if in Example 1 instead of 1,4-naphthhydroquinone-methylene-sulfone ether there are used in equivalent amounts the coupling components given in column 2 of the table and are then converted into chromium or cobalt complexes by the process of Example 2 or Example 3.

TABLE

| (1) Example number | (2) Coupling component | (3) Shade of wool dyed by means of the chromium complex | cobalt complex |
|---|---|---|---|
| 4 | acetic acid anilide | brownish yellow. | yellow. |
| 5 | 1-(2',5'-dichlorophenyl)-3-methyl-5-pyrazolone. | scarlet red | yellowish brown. |
| 6 | 1-(3'-p-chlorobenzene-sulphonylaminophenyl)-3-methyl-5-pyrazolone. | do | Do. |
| 7 | 1-acetylamino-7-hydroxynaphthalene. | greyish blue | bluish currant. |
| 8 | 1-(2'-chlorobenzoyl)-amino-7-hydroxynaphthalene. | | |
| 9 | 1-methylsulphonylamino-7-hydroxynaphthalene. | bluish grey | violet brown. |
| 10 | 2-hydroxynaphthalene | Currant | bluish claret. |
| 11 | 2-hydroxynaphthalene-6-sulphonic acid dimethylamide. | | |
| 12 | 2,4-dihydroxyquinoline | bluish red | yellowish red. |
| 13 | 1,3-dihydroxy isoquinoline | bluish bordo | brick red. |
| 14 | 1,4-naphthhydroquinone-mono-methyl ether. | blue | violet. |

*Example 15*

23 kilograms of 1-amino-2-methoxy-5-(N-methyl-N-methyl-sulphonyl)-aminobenzene are stirred together with 100 kilograms of ice and 25 litres of hydrochloric acid (*d* 1.2) and diazotized by the addition of 50 litres of a nitrite solution containing 6.9 kilograms of sodium nitrite.

The diazonium salt solution is run with good stirring into a solution of 18.6 kilograms of hydroquinone methylene sulfone ether in 120 litres of water, 12 litres of sodium hydroxide solution (40° Bé.) and 150 litres of a 20 percent sodium carbonate solution. The coupling is completed after a short time, the precipitated red dyestuff is filtered off by suction and dried; it corresponds to the formula:

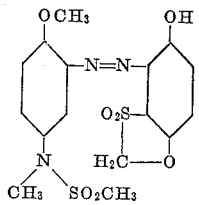

The dried dyestuff is suspended in 450 litres of ethylene glycol at 50° C. and is then reacted with 12.2 kilograms of chromic acetate. It is slowly heated to 135° C. and kept at this temperature for 9 hours. The reaction is always maintained brilliant yellow alkaline by the addition of sodium hydroxide solution. The greater part of the dyestuff is dissolved. The reaction mixture is cooled to room temperature, filtered off from a small undissolved portion, and the filtrate is poured into 1,500 litres of a saturated common salt solution. The precipitated dyestuff chromium complex is filtered off and dried. It is a bluish black powder which dyes wool from a formic acid bath in fast bluish violet shades.

*Example 16*

46.3 kilograms of the dyestuff having the formula

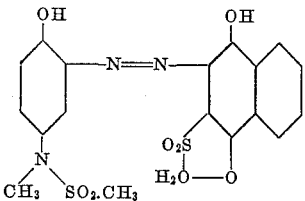

and 38.7 kilograms of the dyestuff having the formula

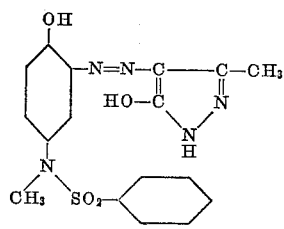

are dissolved in 4,000 litres of water at 95° C. with 16 kilograms of sodium hydroxide. A solution of 16.5 kilograms of sodium bichromate and 30 kilograms of glycose in 100 litres of water is added dropwise within 10 minutes. After a further 15 minutes the chroming is completed. The mixture is cooled to 70° C. and treated with 200 kilograms of rock salt. The precipitate is filtered off by suction and dried.

A dark brown powder is obtained, which dissolves in water with a brown coloration. Wool is dyed from a neutral to organic acid bath in level fast reddish yellow shades.

*Example 17*

If in the preceeding example instead of sodium bichromate and glucose there is used as metallising agent 240 litres of the cobalt solution the preparation of which was described in Example 3 but the process is otherwise carried out similarly, a brown powder is likewise obtained which dyes wool from a neutral bath in fast brown shades. The shade is however, more yellow than the dyeing obtained with the mixed chromium complex obtained according to Example 16.

*Example 18*

50.0 kilograms of the dyestuff having the formula

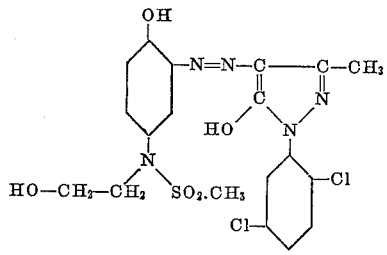

and 44.9 kilograms of the dyestuff having the formula:

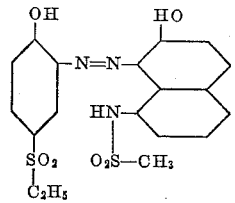

are dissolved in 3,500 litres of water with 12 kilograms of sodium hydroxide at 90° C., and then treated with stirring with 16.5 kilograms of potassium bichromate and 30 kilograms of glucose dissolved in 100 litres of water. The reaction mixture is kept at 95° C. for 25 minutes, is then cooled to 75° C., whereupon 400 kilograms of common salt are sprinkled in. The precipitate is filtered off by suction and dried. It is a black brown powder which dissolves in water with a brown coloration. Wool is dyed from a neutral to weakly acid bath in fast level covered brown shades.

The corresponding mixed cobalt complex dyes wool in substantially more yellowish brown shades.

We claim:
1. A dyestuff selected from the group consisting of monoazo dyestuffs corresponding to the formula

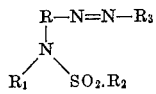

and containing only a single

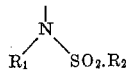

group, wherein R means a radical of the benzene series, bearing in o-position to the azo bridge a group capable of forming a metal complex, $R_1$ stands for a member selected from the group consisting of lower alkyl and hydroxy lower alkyl radical, $R_2$ means a member selected from the group consisting of lower alkyl and a radical of the benzene series and $R_3$ stand for a coupling component bearing in o-position to the azo bridge a group capable of forming a metal complex, the radicals R, $R_2$ and $R_3$ being free from sulfonic and non complex forming carboxylic acid groups; the chromium complexes of said monoazo dyestuffs and the cobalt complexes of said monoazo dyestuffs.

2. A dyestuff selected from the group consisting of monoazo dyestuffs corresponding to the formula

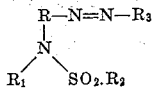

and containing only a single

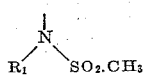

group, wherein R means a radical of the benzene series, bearing in o-position to the azo bridge a group capable of forming a metal complex, $R_1$ stands for a member selected from the group consisting of lower alkyl and hydroxy lower alkyl radical and $R_3$ stands for a coupling component bearing in o-position to the azo bridge a group capable of forming a metal complex the radicals R and $R_3$ being free from sulfonic and non complex forming carboxylic acid groups; the chromium complexes of said monoazo dyestuffs and the cobalt complexes of said monoazo dyestuffs.

3. A dyestuff selected from the group consisting of monoazo dyestuffs corresponding to the formula

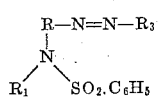

and containing only a single

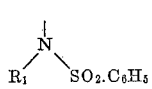

group, wherein R means a radical of the benzene series, bearing in o-position to the azo bridge a group capable of forming a metal complex, $R_1$ stands for a member selected from the group consisting of lower alkyl and hydroxy alkyl radical and $R_3$ stands for a coupling component bearing in o-position to the azo bridge a group capable of forming a metal complex the radicals R and $R_3$ being free from sulfonic and non complex forming carboxylic acid groups; the chromium complexes of said monoazo dyestuffs and the cobalt complexes of said monoazo dyestuffs.

4. A dyestuff selected from the group consisting of monoazo dyestuffs corresponding to the formula

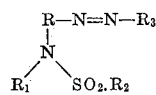

and containing only a single

group, wherein R means a radical of the benzene series, bearing in o-position to the azo bridge a group capable of forming a metal complex and $R_3$ stands for a coupling component bearing in o-position to the azo bridge a group capable of forming a metal complex, the radicals R and $R_3$ being free from sulfonic and non complex forming carboxylic acid groups, and the chromium and cobalt complexes of said monoazo dyestuffs.

5. The chromium complex of the monoazo dyestuff corresponding to the formula

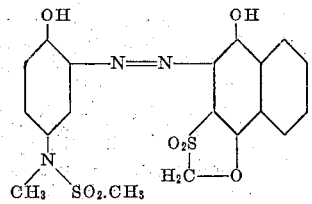

6. The chromium complex of the dyestuff corresponding to the formula

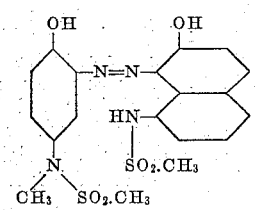

7. A dyestuff selected from the group consisting of monoazo compounds free from sulfonic acid and carboxylic acid groups, corresponding to the formula

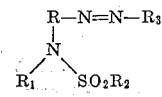

and containing only a single

group, wherein R represents a radical of the benzene series containing an OH group in ortho position to the azo bridge, $R_1$ represents a lower alkyl radical, $R_2$ represents a member selected from the group consisting of lower alkyl and a radical of the benzene series and $R_3$ represents a coupling component containing an OH group in ortho position to the azo bridge; the 1:2 chromium complexes and the 1:2 cobalt complexes of said monoazo compounds.

References Cited in the file of this patent
UNITED STATES PATENTS

| | | |
|---|---|---|
| 704,826 | Herzberg et al. | July 15, 1902 |
| 2,802,817 | Dittmar et al. | Aug. 13, 1957 |

FOREIGN PATENTS

| | | |
|---|---|---|
| 1,092,676 | France | Nov. 10, 1954 |
| 1,095,561 | France | Dec. 22, 1954 |